United States Patent
Kim et al.

(10) Patent No.: US 8,854,671 B2
(45) Date of Patent: Oct. 7, 2014

(54) METHOD AND APPARATUS FOR SETTING PRINTING OPTION

(75) Inventors: Sang-yeon Kim, Suwon-si (KR); In-sung Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

(21) Appl. No.: 13/590,797

(22) Filed: Aug. 21, 2012

(65) Prior Publication Data

US 2013/0088739 A1    Apr. 11, 2013

(30) Foreign Application Priority Data

Oct. 5, 2011 (KR) .................. 10-2011-0101435

(51) Int. Cl.
*G06F 15/00* (2006.01)
*G06F 3/12* (2006.01)
*G06K 1/00* (2006.01)

(52) U.S. Cl.
CPC ............ *G06F 3/1205* (2013.01); *G06F 3/1238* (2013.01); *G06F 3/1253* (2013.01)
USPC ....................................... 358/1.15; 358/1.14

(58) Field of Classification Search
CPC .... G06F 3/1205; G06F 3/1238; G06F 3/1253
USPC ................................ 358/1.1, 1.15, 1.13, 1.14
See application file for complete search history.

(56) References Cited

U.S. PATENT DOCUMENTS

| 2009/0268239 A1* | 10/2009 | Kawara | 358/1.15 |
| 2010/0231963 A1* | 9/2010 | Oda et al. | 358/1.15 |
| 2013/0159044 A1* | 6/2013 | Lopez et al. | 705/7.23 |

* cited by examiner

*Primary Examiner* — Douglas Tran
(74) *Attorney, Agent, or Firm* — Staas & Halsey LLP (57) ABSTRACT

A method of setting printing options at a host apparatus using a LINUX-based operation system (OS), the method including displaying at least one printing option providing text input for a user from among printing options provided by an image forming apparatus connected to the host apparatus; receiving setting information regarding printing options selected by a user from among the at least one printing option as text input; and storing the setting information with the corresponding printing options.

20 Claims, 10 Drawing Sheets

List Box

FIG. 5B

Check Box

☑ Vi<u>s</u>ible    ☐ <u>G</u>roup    ☐ <u>H</u>elp ID

☐ Dis<u>a</u>bled    ☐ Ta<u>b</u> stop

FIG. 5C

Radio Button

○ Radio 1

○ Radio 2

○ Radio 3

◉ Radio 4

FIG. 5D

Edit Box

| 159 |
|-----|

FIG. 6

```
- <UserInput>
    - <JobAccounting>
        <name CURRENT="kim" />
        <password CURRENT="1234" />
    - </JobAccounting>
    - <CustomSize>
        <Height CURRENT="23" />
        <Width CURRENT="12" />
    - </CustomSize>
- </UserInput>
```

FIG. 7

```
- <UserInputFlag>
    <value CURRENT="1" />
  </UserInputFlag>
```

METHOD AND APPARATUS FOR SETTING PRINTING OPTION

CROSS-REFERENCE TO RELATED APPLICATIONS

This application claims the benefit of Korean Patent Application No. 10-2011-0101435, filed on Oct. 5, 2011, in the Korean Intellectual Property Office, the disclosure of which is incorporated herein in its entirety by reference.

BACKGROUND

1. Field

The present general inventive concept relates to a method and apparatus for setting printing options.

2. Description of the Related Art

Image forming apparatus, including printers and multi-function peripherals, are capable of performing at least one function from among printing print data, photocopying documents, scanning documents, transmitting/receiving data via fax, transmitting an e-mail, etc. In the case of an image forming apparatus printing a document, a user may set printing options for the document. The image forming apparatus prints the document according to the set printing options.

SUMMARY

Additional aspects and/or advantages will be set forth in part in the description which follows and, in part, will be apparent from the description, or may be learned by practice of the invention.

The present disclosure provides a method and apparatus for setting printing options according to text input by a user.

The present disclosure also provides a computer-readable recording medium having recorded thereon a computer program for executing the method.

According to an aspect of the present disclosure, there is provided a method of setting printing options at a host apparatus using a LINUX-based operation system (OS), the method including displaying at least one printing option providing text input for a user from among printing options provided by an image forming apparatus connected to the host apparatus; receiving setting information regarding printing options selected by a user from among the at least one printing option as text input; and storing the setting information with the corresponding printing options. LINUX is a trademark registered to Linus Torvalds and licensing is handled by the Linux Mark Institute.

According to another aspect, there is provided a non-transitory computer-readable recording medium having recorded thereon a computer program for implementing the method of setting printing options.

According to another aspect, there is provided an apparatus for setting printing options using a LINUX-based operation system (OS), the apparatus including a user interface unit for receiving setting information regarding at least one printing option providing text input for a user from among printing options provided by an image forming apparatus connected to the apparatus as text input from a user; a memory for storing the setting information with the corresponding printing options; and a processor for generating a command file according to the stored setting information.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION

The present disclosure will now be described more fully with reference to the accompanying drawings, in which exemplary embodiments are shown. Expressions such as "at least one of," when preceding a list of elements, modify the entire list of elements and do not modify the individual elements of the list.

Hereinafter, embodiments of the present disclosure will be described in detail with reference to the attached drawings.

Figure 1:
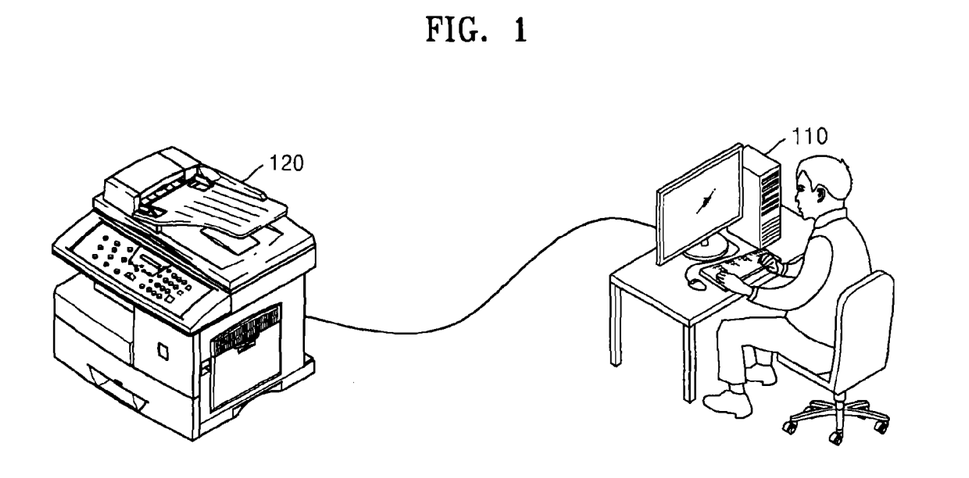
FIG. 1 is a diagram showing an image forming system according to an embodiment of the present general inventive concept.

FIG. 1 is a diagram showing an image forming system according to an embodiment. Referring to FIG. 1, the image forming system according to the present embodiment includes a host apparatus 110 and an image forming apparatus 120. For convenience of explanation, FIG. 1 shows that the image forming system comprises one host apparatus 110 and one image forming apparatus 120. However, the present disclosure is not limited thereto, and a plurality of host apparatuses 110 may be connected to a plurality of image forming apparatuses 120.

To prevent the subject matter of the present embodiment from being obscured, only components related to the present embodiment will be described herein. Therefore, one of ordinary skill in the art would have understood that universal components other than the components shown in FIG. 1 may further be employed.

The host apparatus 110 and the image forming apparatus 120 according to the present embodiment may transmit and receive data via a wired/wireless network or via wired serial communication by using integrated communication modules. Here, the network may include the Internet, a local area network (LAN), a wireless LAN (WLAN), a wide area network (WAN), and a personal area network (PAN). However, the present disclosure is not limited thereto, and one of ordinary skill in the art would have understood that the network may be any type of network via which data may be transmitted and received.

The host apparatus 110 according to the present embodiment is an apparatus for controlling the image forming apparatus 120 and may include any apparatus, such as a universal computer system, a personal digital assistant (PDA), etc., that may be connected to the image forming apparatus 120 and may control the image forming apparatus 120. Furthermore, the host apparatus 110 according to the present embodiment includes any apparatus capable of setting printing options. Detailed description of an apparatus for setting printing options will be provided below with reference to FIG. 2.

The image forming apparatus 120 is an apparatus for forming an image and may include a printer, a scanner, a multi-function peripheral (MFP), etc. Therefore, the image forming apparatus 120 is capable of performing tasks including printing, scanning, photocopying, transmitting/receiving a fax, transmitting an e-mail, transmitting a file to a server, etc. However, the present disclosure is not limited thereto, and one of ordinary skill in the art would have understood that the image forming apparatus 120 is also capable of performing any other task according to operating environments.

In the image forming system 100 shown in FIG. 1, after printing options set by a user are added to a document the user desires to print, the host apparatus 110 outputs print data to which the document is converted to the image forming apparatus 120 connected to the host apparatus 110. The image forming apparatus 120 prints the print data on a printing paper according to the printing options set by the user.

Figure 2:
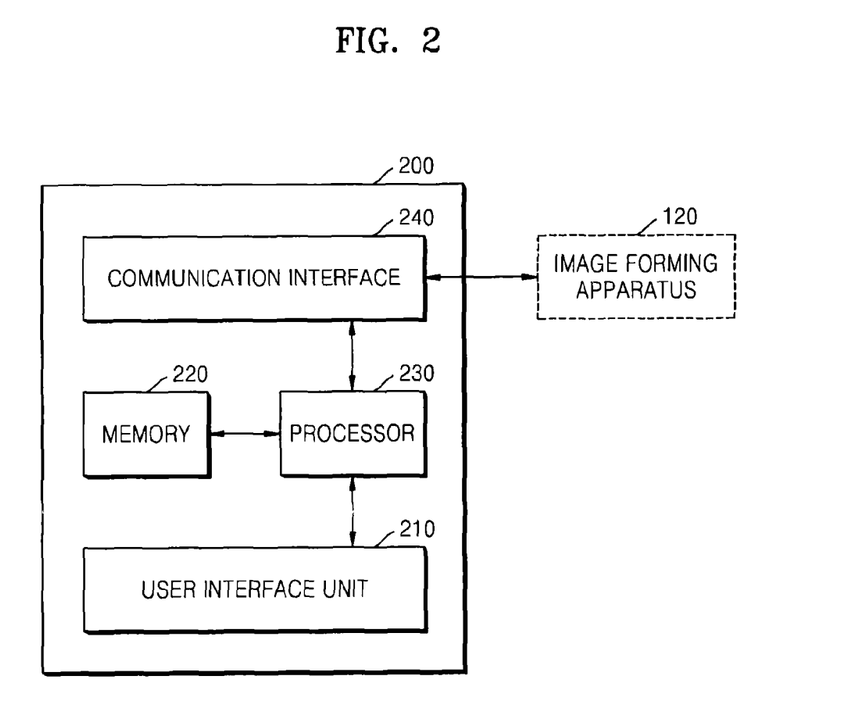
FIG. 2 is a block diagram of an apparatus for setting printing options for a document to be printed, according to an embodiment of the present general inventive concept.

FIG. 2 is a block diagram of an apparatus 200 for setting printing options for a document to be printed, according to an embodiment of the present general inventive concept.

Referring to FIG. 2, the apparatus 200 for setting printing options includes a user interface unit 210, a memory 220, a processor 230, and a communication interface 240. The apparatus 200 for setting printing options shown in FIG. 2 may be included in the host apparatus 110 shown in FIG. 1. However, the present disclosure is not limited thereto, and the apparatus 200 for setting printing options may be included in the image forming apparatus 120.

In FIG. 2, the apparatus 200 for setting printing options only includes components related to the current embodiment. Therefore, one of ordinary skill in the art would have understood that the apparatus 200 for setting printing options may also include other general-purpose components other than the components shown in FIG. 2.

The user interface unit 210 receives setting information regarding at least one printing option for providing text input for a user from among printing options provided by the image forming apparatus 120 connected to the apparatus 200 for setting printing options as text input from a user.

The printing option for providing text input for a user may include a printing option for authenticating a user of the image forming apparatus 120. Authenticating a user of the image forming apparatus 120 is performed by receiving user authentication information from the user in the apparatus 200 for setting printing options connected to the image forming apparatus 120. Therefore, a user inputs user authentication information as setting information to the apparatus 200 for setting printing options as a text, and the apparatus 200 for setting printing options sets the printing option for authenticating the user by using the setting information.

As an example of user authentication information, job accounting (JAC) will be described below. A job accounting (JAC) function provided by the image forming apparatus 120 is a function for limiting and managing users of the image forming apparatus 120. The image forming apparatus 120 receives a user ID and a password from a user via the apparatus 200 for setting printing options connected to the image forming apparatus 120.

In other words, a user inputs a user ID and a password as text to the apparatus 200 for setting printing options, and the apparatus 200 for setting printing options stores the user ID and the password and generates a command file to be transmitted to the image forming apparatus 120. Therefore, even in an environment using a LINUX-based operating system (OS), a user may set a printing option for authenticating the user by inputting a user ID and a password as a text by using the apparatus 200 for setting printing options.

A printing option for providing text input for a user according to another embodiment may include a printing option for customizing the size of a printing paper of the image forming apparatus 120. The printing option for customizing the size of a printing paper is set as a user inputs the desired size of a printing paper as a text to the apparatus 200 for setting printing options connected to the image forming apparatus 120. The image forming apparatus 120 receives a command file including setting information from the apparatus 200 for setting printing options and performs a printing task on the set customized size paper.

In other words, in the case where a user desires to print a document on a printing paper of a particular size, the user may select the printing option for customizing the size of a printing paper by using the apparatus 200 for setting printing options and input the desired size of a printing paper as a text to a text input box. Therefore, the user may print a document on a printing paper in the particular size customized by the user.

The printing option for providing text input for a user according to the present disclosure is not limited to the printing option for authenticating a user and the printing option for customizing the size of a printing paper, and one of ordinary skill in the art would have understood that other printing options for providing text input for a user may further be included in the printing option for providing text input for a user according to the present general inventive concept.

Hereinafter, for convenience of explanation, the function for setting printing options for providing text input for a user will be referred to as a user-input function.

The user interface unit 210 according to an embodiment displays at least one printing option providing text input for a user, that is, the printing option providing the user-input function. Furthermore, the user interface unit 210 displays the plurality of image forming apparatuses 120, so that a user may select one from among the plurality of image forming apparatuses 120 to print. Detailed description thereof will be provided below with reference to FIGS. 3 and 4.

The apparatus 200 for setting printing options displays at least one printing option providing the user-input function with reference to a script file in which printing options of the image forming apparatus 120 are defined. The image forming apparatus 120 provides printing options according to functions of the image forming apparatus 120, and printing options provided by the image forming apparatus 120 are defined in a script file of the image forming apparatus 120 in advance.

A script file is a file in which printing options according to functions of the image forming apparatus 120 are defined. A script file according to the present embodiment may be a postscript printer description (PPD) file, but is not limited thereto.

The processor 230 reads out a script file provided by the image forming apparatus 120 and outputs printing options providing the user-input functions from among printing options provided by the image forming apparatus 120 to the user interface unit 210. The user interface unit 210 receives and displays the printing options providing the user-input function.

According to an embodiment of the present general inventive concept, a script file may be provided by a driver module of the image forming apparatus 120 installed on the apparatus 200 for setting printing options. However, the present disclosure is not limited thereto, and a script file may be provided via a network or a separate storage medium.

The user interface unit 210 according to an embodiment of the present general inventive concept receives setting information regarding at least one printing option providing text input for a user from among printing options provided by a selected image forming apparatus, as text input from a user.

Via the user interface unit 210, a user may select one printing option tab from among printing options providing text input for a user and may view a screen for inputting setting information regarding the selected printing option. The user may input setting information regarding a desired printing option as a text via the user interface unit 210. Furthermore, the user may select a document to print and select the image forming apparatus 120 to print the selected document via the user interface unit 210.

Accordingly, information input via the user interface unit 210 is output to the processor 230 and is stored in the memory 220 or is displayed on the user interface unit 210.

The user interface unit 210 according to the present embodiment receives information input by a user and displays output information to the user. For example, the user interface unit 210 may include both input/output devices, such as a display panel, a touch screen, a monitor, a mouse, a keyboard, a speaker, etc., and software modules for driving the input/output devices.

According to an embodiment of the present general inventive concept, even in an environment using a LINUX-based OS, a user may input setting information for a printing option providing the user-input function, such as job accounting for a user or customizing the size of a printing paper, as text input. Therefore, the user may utilize various functions of printing options provided by the image forming apparatus 120.

The memory 220 stores the setting information input as a text with the corresponding printing option. The setting information input as text may be stored in a database of the memory 220 in extensible markup language (XML) format, for example. However, the present disclosure is not limited thereto. Detailed description thereof will be provided with reference to FIG. 2.

Furthermore, the memory 220 stores a flag value indicating that a printing option providing the user-input function, such as a JAC 411, is set.

For example, if a printing option providing the user-input function is set, the processor 230 may store a flag value "1" in the memory 220. If a printing option providing the user-input function is not set, the apparatus 200 for setting printing options may set a flag value "0" indicating that the printing option providing the user-input function is not set. Here, a flag value may be stored in XML format, like setting information for a printing option. However, the present disclosure is not limited thereto. Detailed description thereof will be provided below with reference to FIG. 7.

The memory 220 according to an embodiment of the present disclosure is a general storage medium, and one of ordinary skill in the art would have understood that the memory 220 may be implemented as a hard disk drive (HDD), a read-only memory (ROM), a random access memory (RAM), a flash memory, a memory card, a solid state drive (SSD), etc.

The processor 230 generates a command file in reference to the setting information stored in the memory 220. The generated command file is transmitted to the image forming apparatus 120 via the communication interface unit 240, and the image forming apparatus 120 performs a printing task according to the transmitted command file.

In other words, a command file is an instruction to be transmitted to the image forming apparatus 120 and describes print format of a page to be printed by the image forming apparatus 120 in a language interpreted by the image forming apparatus 120. A command file according to an embodiment of the present general inventive concept may be embodied in page description language (PDL). However, the present disclosure is not limited thereto.

The processor 230 generates a command file corresponding to a printing option set by a user by using the setting information. In a script file in which printing options are defined, a default PDL value is defined. Therefore, the processor 230 generates a command file corresponding to a printing option set by a user with reference to a default PDL value of a script file. Detailed descriptions thereof will be provided below with reference to FIG. 8.

As described above, when the setting information input as a text are stored in the memory 220, the processor 230 sets a flag value indicating that at least one printing option providing the user-input function is set.

Based on the set flag value, the processor 230 determines whether at least one printing option providing the user-input function is set. If at least one printing option providing the user-input function is set, the processor 230 generates a command file for the corresponding printing option according to the setting information.

When print data is generated in a driver module (not shown) in response to a request of a user, the processor 230 adds the command file to the generated print data.

Here, print data is converted data from a document to be interpreted by the image forming apparatus 120. Print data may be generated by a driver module (not shown) of the image forming apparatus 120 invoked by an application program and may include a document to be printed and setting information of printing options set by the application program.

Furthermore, a task for adding a command file to print data may be performed by the processor 230 of the apparatus 200 for setting printing options or the host apparatus 110 including the apparatus 200 for setting printing options. Detailed description thereof will be provided below with reference to FIG. 9.

The processor 230 transmits final print data to the communication interface unit 240. Furthermore, when a command file is added to print data, the processor 230 resets a flag value stored in the memory 220. For example, the processor 230 resets a flag value stored in the memory 220 to "0". Therefore, the flag value is reset back to the default state before a printing option providing the user-input function is set.

The processor 230 controls overall operations of the apparatus 200 for setting printing options. In other words, the processor 230 controls the user interface unit 210, the memory 220, and the communication interface unit 240. Therefore, the processor 230 controls to receive information via the user interface unit 210 and to output of a result of processing the received information via the user interface unit 210. Furthermore, the processor 230 controls to read out data stored in the memory 220 or to store input data in the memory 220.

The communication interface unit 240 transmits print data, to which a command file is added, to the image forming apparatus 120. The image forming apparatus 120 prints a document according to printing options set based on the transmitted command file. In other words, the image forming apparatus 120 receives print data, interprets the print data, and prints the print data in a form that may be recognized by a user, e.g., text, images, etc.

The communication interface unit 240 transmits and receives data to and from the image forming apparatus 120 via a network. Networks according to the present embodiment include both wired networks and wireless networks. Furthermore, the network may include the Internet, a LAN, a WLAN, a WAN, and a PAN. However, the present general inventive concept is not limited thereto, and one of ordinary skill in the art would have understood that the network may be any type of network via which data may be transmitted and received.

A driver module (not shown) includes at least one program for controlling the image forming apparatus 120. As described above, a driver module according to the present embodiment converts a document composed by an application program of the host apparatus 110 to print data that may be interpreted by the image forming apparatus 120 to print the document via the image forming apparatus 120.

According to an embodiment of the present general inventive concept, a driver module may be included in the host apparatus 110 or the apparatus 200 for setting printing options. However, the present general inventive concept is not limited thereto. Furthermore, a driver module may add print data to a command file generated by the apparatus 200 for setting printing options. A driver module may provide a script file of the corresponding image forming apparatus 120 to the apparatus 200 for setting printing options.

As described above, a printing option providing the user-input function may be set even in an environment providing a GUI interface using a LINUX-based OS by using the apparatus 200 for setting printing options according to an embodiment of the present general inventive concept. Therefore, a user may utilize various printing functions provided by the image forming apparatus 120 without any restriction in setting printing options.

Figure 3:
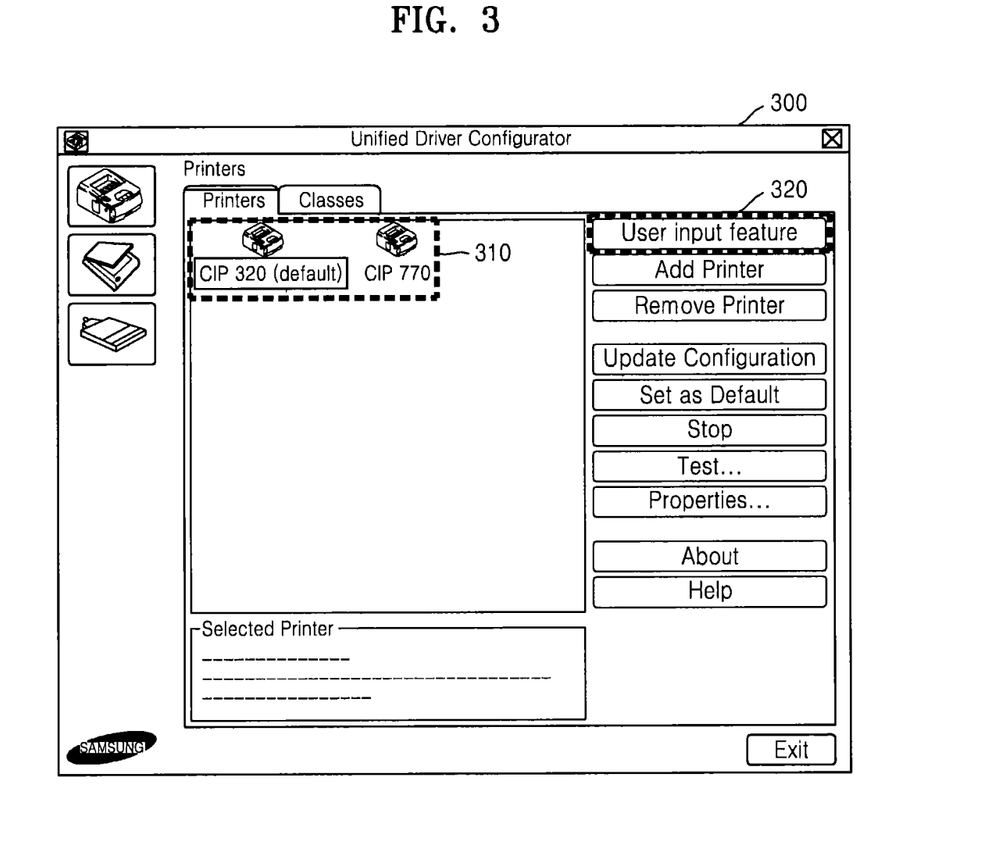
FIG. 3 is a diagram showing a user interface screen for selecting the image forming apparatus which is displayed via the user interface unit of FIG. 2, according to an embodiment of the present general inventive concept.

FIG. 3 is a diagram showing a user interface screen 300 for selecting the image forming apparatus 120 which is displayed via the user interface unit 210 of FIG. 2, according to an embodiment of the present general inventive concept.

The apparatus 200 for setting printing options displays image forming apparatuses 310 that may be used by the apparatus 200 for setting printing options on the user interface screen 300. A user selects an image forming apparatus for setting printing options from among the image forming apparatuses 310 displayed on the user interface screen 300 and presses a button 320 for setting printing options.

Next, the processor 230 invokes information regarding printing options provided by the corresponding image forming apparatus 120 from a script file of the image forming apparatus 120 and outputs the information to the user interface unit 210. The user interface unit 210 displays a user interface screen 400 for setting printing options provided by the image forming apparatus 120. Detailed description thereof will be provided as follows with reference to FIG. 4.

Figure 4:
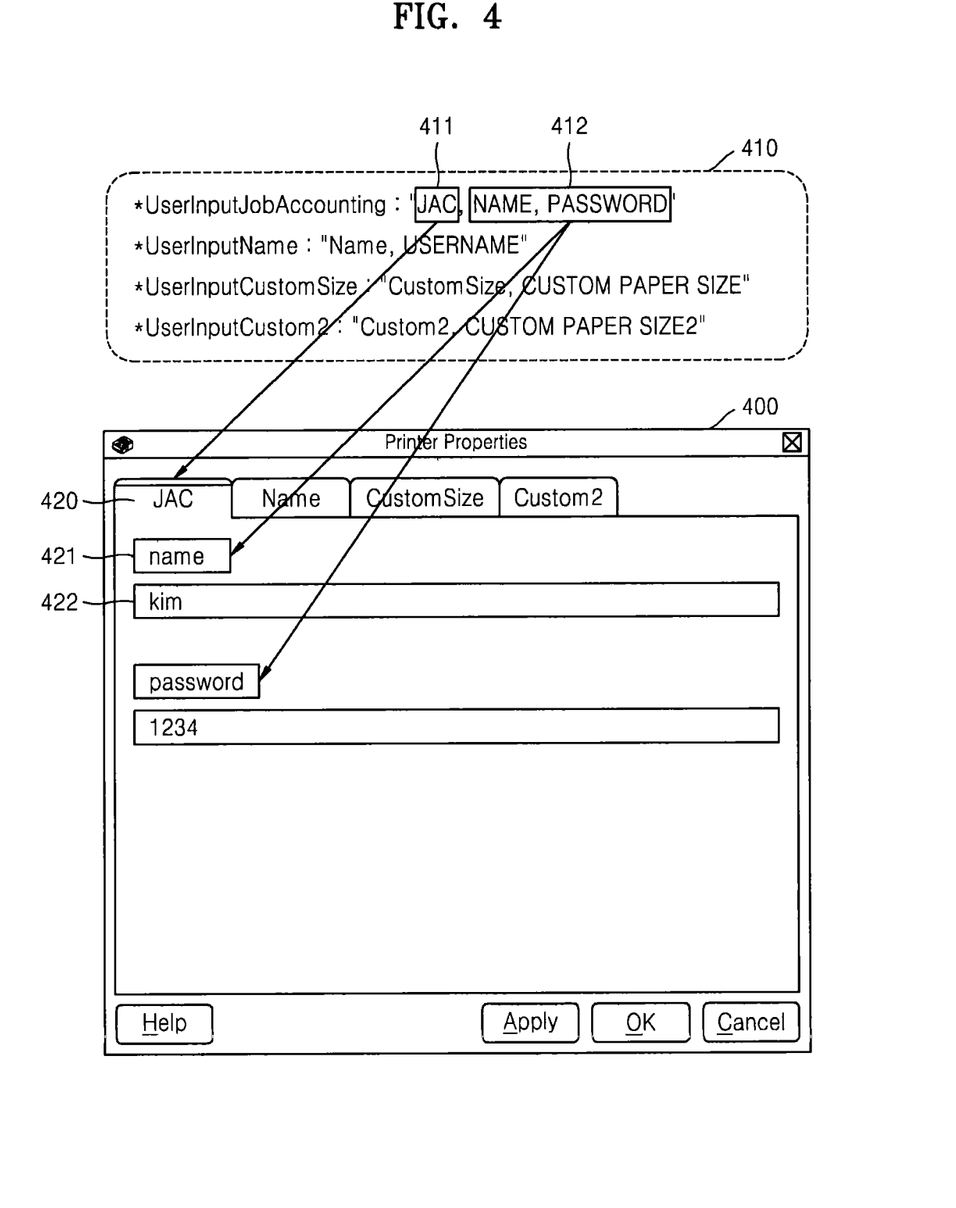
FIG. 4 is a diagram showing that the apparatus for setting printing options invokes information regarding printing options from a script file of an image forming apparatus and displays the printing options on the user interface screen, according to an embodiment of the present general inventive concept.

FIG. 4 is a diagram showing that the apparatus 200 for setting printing options invokes information regarding printing options from a script file of an image forming apparatus 120 and displays the printing options on the user interface screen 400, according to an embodiment of the present general inventive concept.

The user interface screen 400 is a screen for setting printing options of the image forming apparatus 120 according to an embodiment of the present general inventive concept. Via the user interface screen 400 as shown in FIG. 4, printing options providing the user-input function, such as job accounting for a user and customizing the size of a printing paper, may be set.

The user interface screen 400 displayed by the apparatus 200 for setting printing options is configured based on a GUI provided by an OS.

Here, an OS according to an embodiment of the present general inventive concept manages/operates various application programs installed on the apparatus 200 for setting printing options and a host apparatus, provides common services including a GUI to the application programs, and may be installed on the host apparatus or the apparatus 200 for setting printing options.

The apparatus 200 for setting printing options provides a GUI by using a LINUX-based OS. For example, the apparatus 200 for setting printing options based on a LINUX-based OS provides a GUI by using a desktop environment.

Here, a desktop environment is a utility program for configuring a GUI on a LINUX-based OS and providing the GUI to a user. According to an embodiment of the present general inventive concept, a desktop environment may be GNU network object environment (GNOME) or K desktop environment (KDE). However, the present general inventive concept is not limited thereto.

A dialog box is provided to application programs for setting printing options by a desktop environment. The dialog box provides setting of the printing options via selection of one or more items from among a plurality of items. Detailed description thereof will be provided below with reference to FIGS. 5A, 5B, and 5C.

Figure 5A:
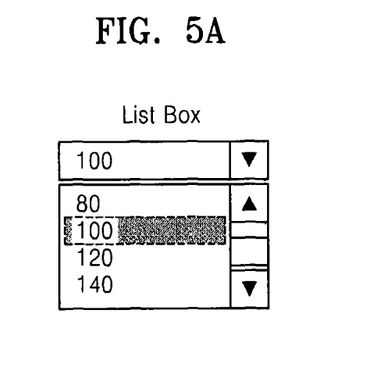
FIG. 5A is a diagram showing a list box provided by a dialog box for setting printing options provided by a desktop environment, according to an embodiment of the present general inventive concept.

A list box, as shown in FIG. 5A, is an example of a means for setting printing options, provided by a dialog box. The list box shown in FIG. 5A displays a list of items predetermined by a developer in the form of a pull-down menu. A user may set a printing option by selecting one from among the plurality of items.

Figure 5B:
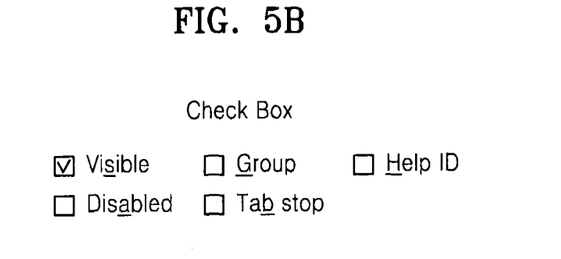
FIG. 5B is a diagram showing a check box provided by a dialog box for setting printing options provided by a desktop environment, according to an embodiment of the present general inventive concept.

A check box, as shown in FIG. 5B, is another example of a means for setting printing options, provided by a dialog box. The check box as shown in FIG. 5B is provided, such that one or more items desired by a user may be checked from among a plurality of items predetermined by a developer.

Figure 5C:
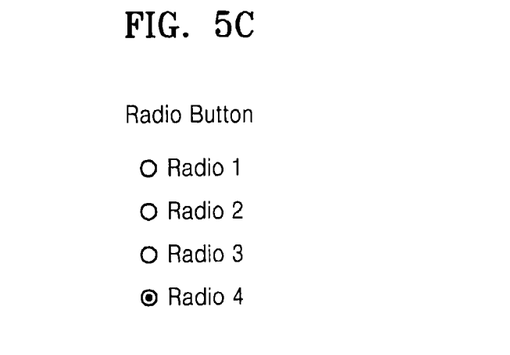
FIG. 5C is a diagram showing a radio button provided by a dialog box for setting printing options provided by a desktop environment, according to an embodiment of the present general inventive concept.

A radio button, as shown in FIG. 5C, is another example of a means for setting printing options, provided by a dialog box. The radio button, as shown in FIG. 5C, is provided, such that a user may select one desired item from among a plurality of items predetermined by a developer.

A dialog box for setting printing options provided by a desktop environment using a LINUX-based OS does not provide a function for a user to input setting information as a text to set printing options.

According to an embodiment of the present general inventive concept, the apparatus 200 for setting printing options may provide a function for a user to input desired setting values as a text to set printing options even in an environment using a LINUX-based OS.

Figure 5D:
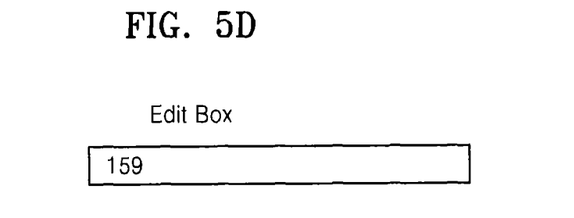
FIG. 5D is a diagram showing an edit box provided by a dialog box for setting printing options provided by a desktop environment, according to an embodiment of the present general inventive concept.

An edit box, as shown in FIG. 5D, is an example of a means which allows a user to input a text for setting printing options, provided by the apparatus 200 for setting printing options. The edit box, as shown in FIG. 5D, is provided, such that a user may directly input desired setting values as text. A user may set printing options by directly inputting desired setting values to edit boxes.

From among printing functions provided by the image forming apparatus 120, in the case of printing functions whose printing options are set by receiving text inputs from a user, the apparatus 200 for setting printing options according to an embodiment may prevent a problem that the printing functions cannot be fully utilized due to not providing text inputs for setting printing options in an environment using a LINUX-based OS.

Referring back to FIG. 4, the apparatus 200 for setting printing options displays printing options providing the user-input function on the user interface screen 400 with reference to a script file 410. The script file 410 corresponds to a script file of the image forming apparatus 120 selected by a user. The script file 410 is written in, for example, PPD format, according to an embodiment.

The apparatus 200 for setting printing options invokes information regarding the printing options providing the user-input function from the script file 410. According to an embodiment of, the apparatus 200 for setting printing options determines whether printing options described in the script file 410 correspond to the printing options providing the user-input function or not based on starting with "Userinput" and displays the printing option on the user interface screen 400 as a result of the determination. In other words, all printing options starting with "Userinput" in a PPD file, which are JobAccounting, Name, CustomSize, and Custom2, indicate the printing options providing the user-input function.

The apparatus 200 for setting printing options interprets the first line of the script file 410, that is, '*UserInputJobAccounting: "JAC, NAME, PASSWORD"' and displays the user interface screen 400. The "JobAccounting" next to the "*Userinput" indicates that a printing option corresponds to JobAccounting, whereas items after the colon (:) are information displayed on the user interface unit 210 in relation to the printing option JobAccounting.

The first item JAC 411 is for a user to show that displayed information is a printing option related to JAC, whereas the next items 412, "NAME" and PASSWORD", indicate setting information items that needs to be set in relation to the corresponding printing option. The items 412 "NAME" and PASSWORD" are displayed as sub-items of the printing option JAC 420 on the user interface screen 400, where edit boxes 422 are displayed for each of the setting information items, such that a user may input corresponding setting information as text.

An arrow shown in FIG. 4 indicates a task for displaying a printing option such as JAC 411 and setting information items such as items 412 on the user interface screen 400. A user selects a desired printing option 420 on the user interface screen 400 and inputs setting information regarding the corresponding printing option into edit boxes 422 as text.

In other words, when a user wants to set job accounting for a user of the image forming apparatus 120, if the user selects a corresponding printing option, that is, the item JAC 420, the setting information items 421 such as name and password are displayed and the edit boxes 422 for text inputs according to the setting information items 421 are provided.

Therefore, even in an environment providing a GUI by using a LINUX-based OS, a user may set printing options providing the user-input function, such as job accounting for a user or customizing the size of a printing paper according to an embodiment of the present general inventive concept.

Figure 6:
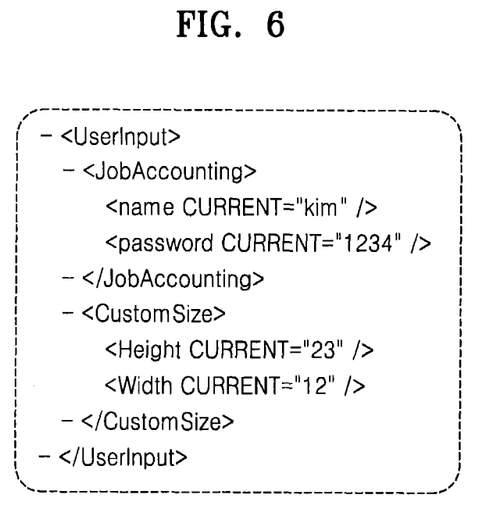
FIG. 6 shows that user-input text that is input by a user in correspondence to the printing options selected in FIG. 4 is stored in XML format, according to an embodiment of the present general inventive concept.

FIG. 6 shows that user-input text that is input by a user in correspondence to the printing options selected in FIG. 4 is stored in XML format, according to an embodiment of the present general inventive concept. When a user selects a printing option of job accounting and inputs setting information corresponding to the selected printing option as text, setting information input by the user is stored in the memory 200 as XML format. A user ID "KIM," which is input by a user in correspondence to the item 412 "NAME" on a user interface screen, is stored as <name CURRENT="KIM"/>, as shown in FIG. 6. Similarly, a password "1234," which is input by a user in correspondence to the item "PASSWORD" on a user interface screen, is stored as <password CURRENT="1234"/>.

Figure 7:
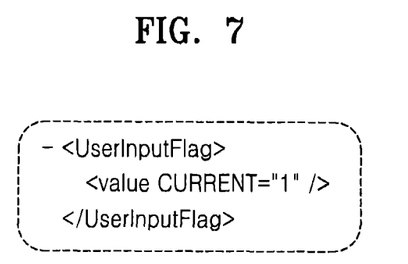
FIG. 7 shows that a flag value indicating that a printing option providing the user-input function is set to the apparatus for setting printing options, according to an embodiment of the present general inventive concept.

FIG. 7 shows that a flag value indicating that a printing option providing the user-input function is set to the apparatus 200 for setting printing options, according to an embodiment of the present general inventive concept. When the flag value indicating that the printing option providing the user-input function is set is set to "1," the flag value shown FIG. 7 indicates that a user has set the printing option providing the user-input function by using the apparatus 200 for setting printing options according to an embodiment of the present general inventive concept.

After the image forming apparatus 120 performs a task for printing a document according to set printing options, the processor 230 resets a flag value stored in the memory 220 to "0" back to the state before the printing options providing the user-input function are set.

Figure 8:
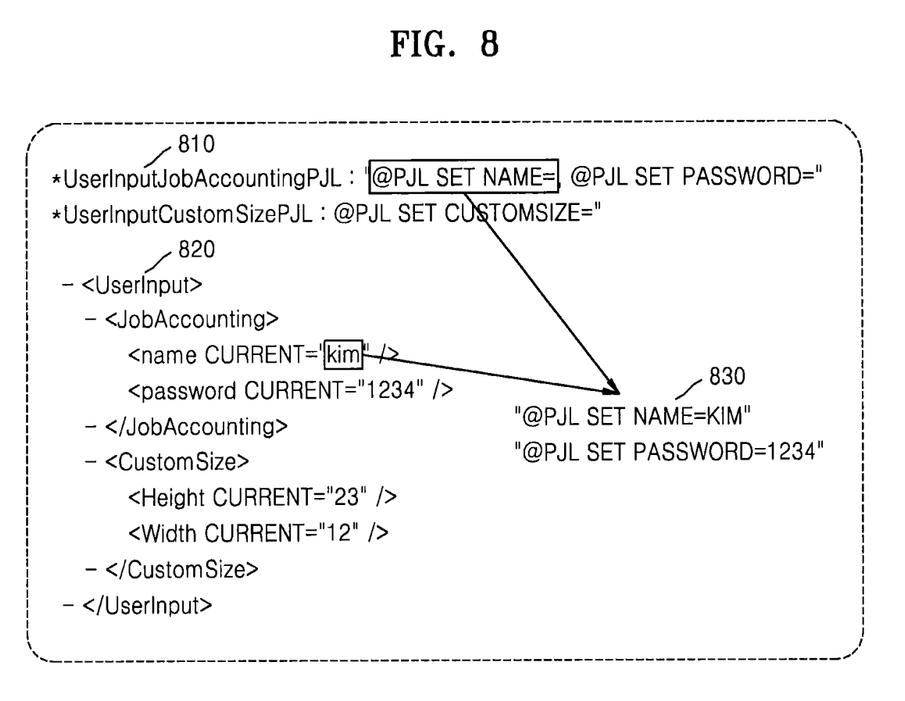
FIG. 8 shows an operation for generating a PDL file by referring to text input by a user, according to an embodiment of the present general inventive concept.

FIG. 8 shows an operation for generating a PDL file by referring to text input by a user, according to an embodiment of the present general inventive concept. The processor 230 generates a command file 830 according to setting information 820 stored in the memory 220 with reference to a script file 810 in which default PDL parameters are defined.

In other words, the processor 230 reads out the default PDL parameter "@PJL SET NAME=" corresponding to the printing option JobAccounting set by a user from the script file 810. Furthermore, the processor 230 reads out setting information 820 <name CURRENT="KIM"/> stored in the memory 220 according to text input by the user. The processor 230 generates a command "@PJL SET NAME=KIM"

that is to be transmitted to the image forming apparatus 120 based on the read out information.

Figure 9:
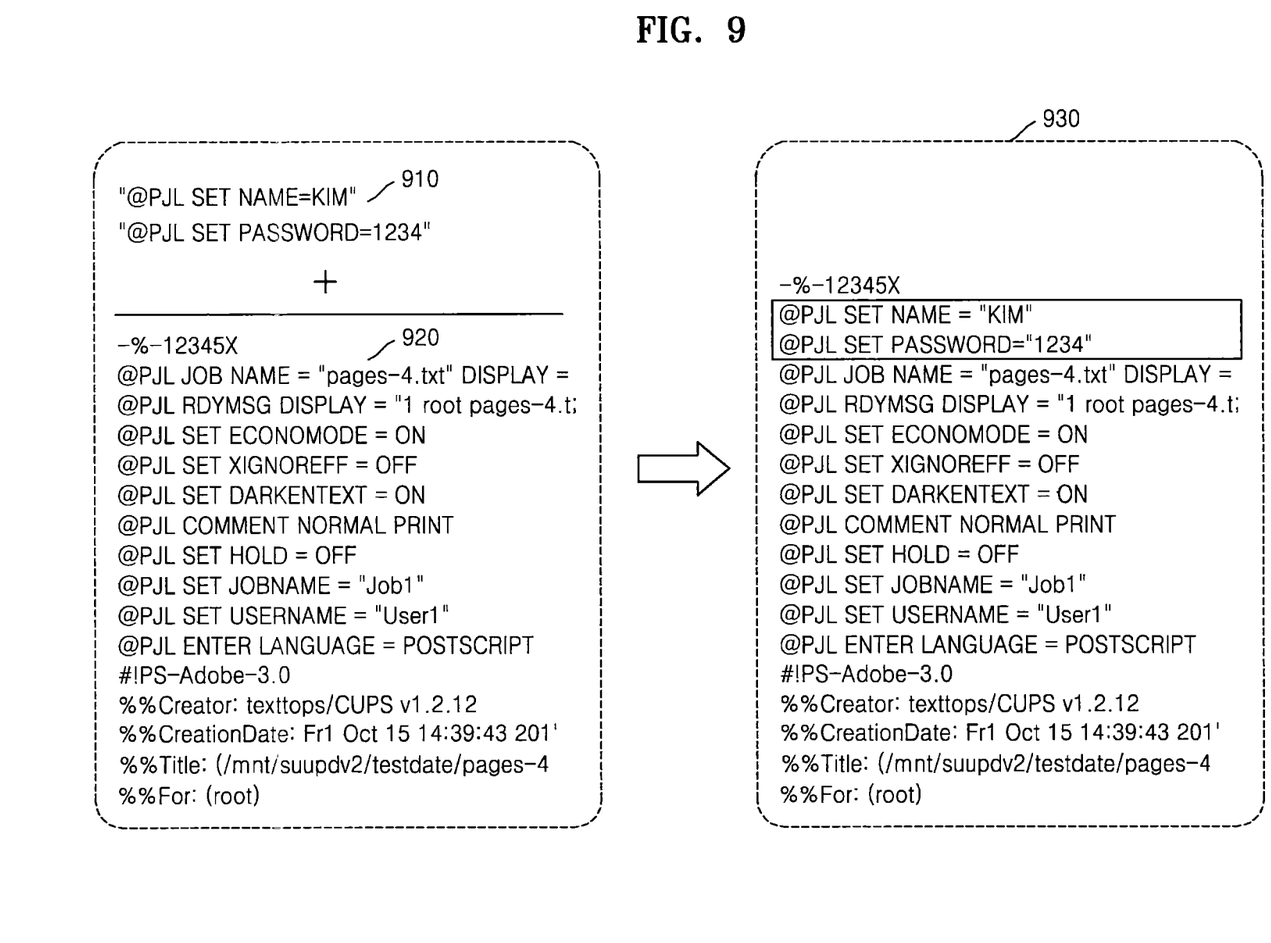
FIG. 9 is a diagram showing a task for adding a command file generated by the apparatus for setting printing options to print data, according to an embodiment of the present general inventive concept.

FIG. 9 is a diagram showing a task for adding a command file 910 generated by the apparatus 200 for setting printing options to print data 920, according to an embodiment of the present general inventive concept. Here, the print data 920 is converted data from a document to be interpreted by the image forming apparatus 120. The print data 920 is generated by a driver module (not shown) of the image forming apparatus 120 invoked by an application program. The print data 920 may include a document to be printed and setting information of printing options set by the application program.

For example, a user sets a printing option providing the user-input function by using the apparatus 200 for setting printing options and invokes a document to be printed via an application program. In the application program, the user sets printing options other than the printing option providing the user-input function for the document to be printed and requests to print the document by pressing a print button. In response to the request of the user, the application program invokes a driver module (not shown) of a corresponding image forming apparatus and the print data 920 is generated by the invoked driver module.

Accordingly, the command file 910 generated by using the apparatus 200 for setting printing options is added to the print data 920. According to an embodiment of the present general inventive concept, the command file 910 may be added to the header of the print data 920, as shown in FIG. 9. The task for adding the command file 910 to the print data 920 may be performed by the processor 230 of the apparatus 200 for setting printing options or the host apparatus 110.

Final print data 930 generated as described above is transmitted to the image forming apparatus 120 via the communication interface unit 240. The image forming apparatus 120 receives the final print data 930, interprets the final print data 930, and prints the print data in a form that may be recognized by a user, e.g., text, images, etc.

According to an embodiment of the present general inventive concept, even in an environment using a LINUX-based OS, a user may set printing options providing the user-input function by using the apparatus 200 for setting printing options, and thus a problem that printing functions provided by the image forming apparatus 120 cannot be fully utilized due to failure of setting the printing options may be prevented.

Figure 10:
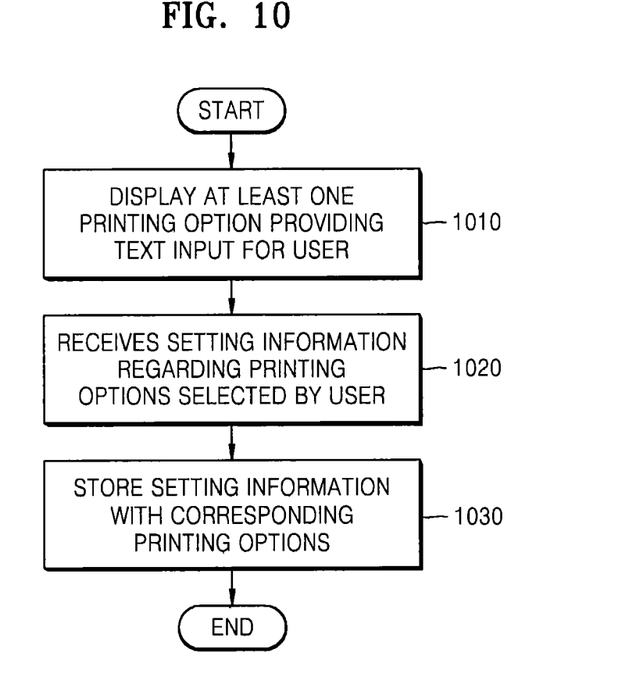
FIG. 10 is a flowchart showing an example of a method of setting printing options at the apparatus for setting printing options, according to an embodiment of the present general inventive concept.
Figure 11:
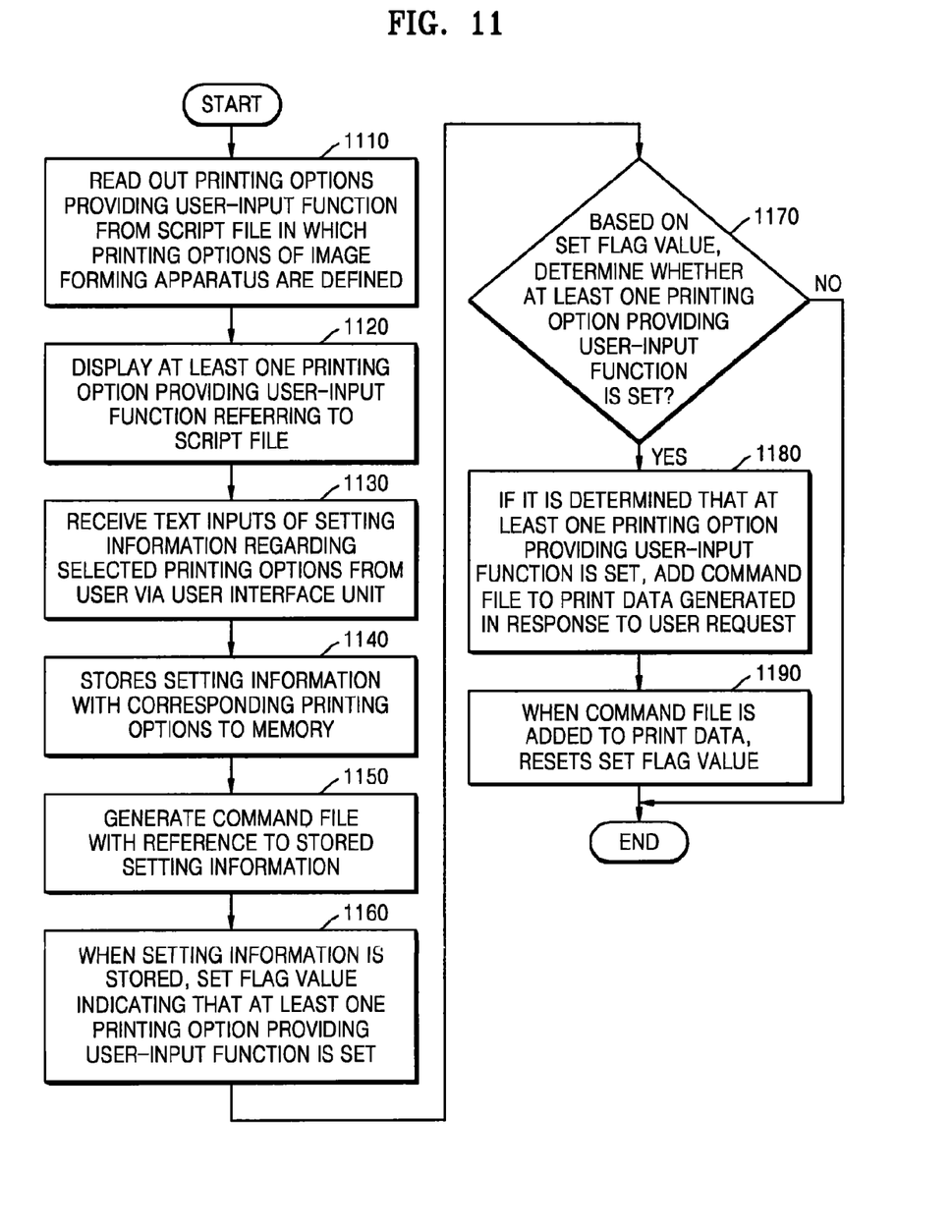
FIG. 11 is a flowchart showing an example of a method of setting printing options at the apparatus for setting printing options, according to an embodiment of the present general inventive concept.
Figure 12:
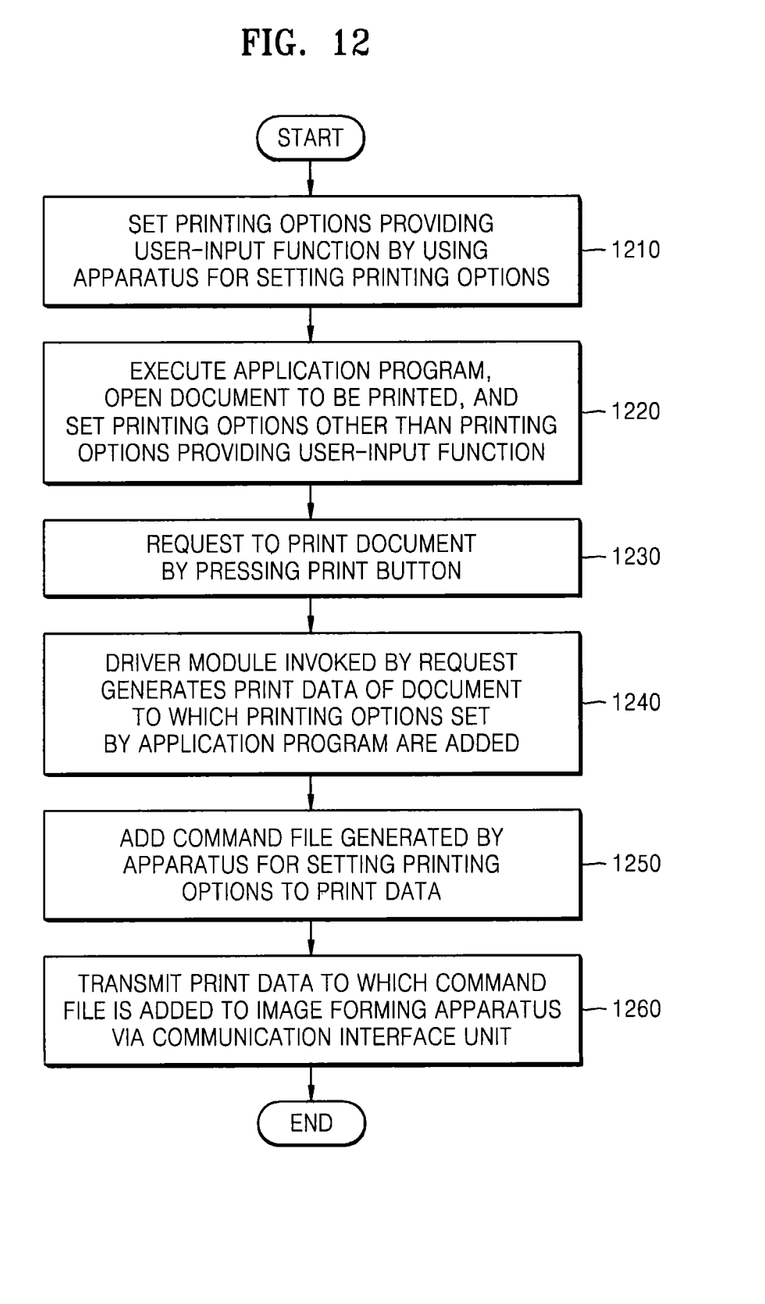
FIG. 12 is a flowchart showing an example of a method of applying printing options set by the apparatus for setting printing options to print data, according to an embodiment of the present general inventive concept.

FIGS. 10 through 12 are flowcharts showing various methods according to embodiments of the present general inventive concept. FIGS. 10 through 12 show operations that are chronologically performed by the host apparatus 110, the image forming apparatus 120, and the apparatus 200 for setting printing options shown in FIGS. 1 and 2. Therefore, even if detailed descriptions are omitted below, detailed descriptions provided above regarding the host apparatus 110, the image forming apparatus 120, and the apparatus 200 for setting printing options shown in FIGS. 1 and 2 may also apply to FIGS. 10 through 12.

FIG. 10 is a flowchart showing an example of a method of setting printing options at the apparatus 200 for setting printing options, according to an embodiment.

In operation 1010, the user interface unit 210 displays at least one printing option providing text input for a user. For example, the apparatus 200 for setting printing options displays printing options providing the user-input function from among printing options provided by the image forming apparatus 120 selected by a user.

In operation 1020, the apparatus 200 for setting printing options receives setting information regarding printing options selected by a user as text input via the interface unit 210. In other words, a user selects desired printing options from among printing options displayed on the user interface unit 210 and inputs setting information regarding the selected printing options as text.

In operation 1030, the processor 230 stores the setting information input in operation 1020 with the corresponding printing options in the memory 220. For example, the setting information input by a user may be stored in a database of the memory 220 in XML format. However, the present disclosure is not limited thereto.

Even in an environment providing a GUI by using a LINUX-based OS, a user may set printing options providing the user-input function, such as job accounting for a user or customizing the size of a printing paper, by using the apparatus 200 for setting printing options. Therefore, printing functions that are provided by image forming apparatus 120 and are not usable in an environment providing a GUI by using a LINUX-based OS in the related art may be utilized.

FIG. 11 is a flowchart showing an example of a method of setting printing options at the apparatus 200 for setting printing options, according to an embodiment.

In operation 1110, the processor 230 reads out printing options providing the user-input function from a script file in which printing options of the image forming apparatus 120 are defined. According to an embodiment of the present general inventive concept, the script file in which printing options of the image forming apparatus 120 are defined may be a PPD file. However, the present general inventive concept is not limited thereto.

In operation 1120, the user interface unit 210 displays at least one printing option providing the user-input function referring to the script file of operation 1110. The printing options providing the user-input function that are read out in operation 1110 are displayed at tabs on a user interface screen, respectively, and setting information that needs to be set regarding the printing options are displayed as sub-menus of corresponding tabs. The user interface screen provides edit boxes with the setting information.

In operation 1130, the apparatus 200 for setting printing options receives text inputs of setting information regarding the selected printing options from a user via the user interface unit 210. In other words, the user sets printing options by inputting setting information to the edit boxes displayed on the user interface screen of operation 1120 as a text.

In operation 1140, the processor 230 stores text input in operation 1130 with the corresponding printing options to the memory 220. The text input by a user may be stored in a database of the memory 220 in XML format. However, the present disclosure is not limited thereto.

In operation 1150, the processor 230 generates a command file including setting information regarding printing options with reference to the text stored in operation 1140. For the image forming apparatus 120 to print a document according to the setting information set via the apparatus 200 for setting printing options, the processor 230 generates a command file that may be recognized by the image forming apparatus 120 based on the stored text.

In operation 1160, when the text is stored in operation 1140, the processor 230 sets a flag value indicating that at least one printing option providing the user-input function is set. The set flag value may be stored in the memory 220. However, the present disclosure is not limited thereto.

In operation 1170, based on the flag value set in operation 1160, the processor 230 determines whether at least one printing option providing the user-input function is set. If no printing option is set by the apparatus 200 for setting printing options, it is not necessary to add a command file to print data as in operation 1180.

In operation 1180, if it is determined in operation 1170 that at least one printing option providing the user-input function is set, the processor 230 adds the command file generated in operation 1150 to print data generated in response to a request of a user.

When an application program receives a request of a user to print a document, the application program invokes a driver module of the image forming apparatus 120 and generates print data. The apparatus 200 for setting printing options adds a command file regarding printing options set by the apparatus 200 for setting printing options to the print data. Therefore, the print data to which the command file is added is transmitted to the image forming apparatus 120, and the image forming apparatus 120 prints the document as set by the apparatus 200 for setting printing options. A task for adding the command file to the print data may be performed by the driver module of the image forming apparatus 120.

In operation 1190, when the command file is added to the print data in operation 1180, the processor 230 resets the flag value set in operation 1160. After a document is printed based on the print data to which the command file is added, the apparatus 200 for setting printing options is restored to the default setting, so that the set printing options are not applied to other documents to be printed.

FIG. 12 is a flowchart showing an example of a method of applying printing options set by the apparatus 200 for setting printing options to print data, according to an embodiment of the present general inventive concept. A driver module (not shown) of the image forming apparatus 120 may be included in the apparatus 200 for setting printing options or the host apparatus 110.

In operation 1210, a user sets printing options providing the user-input function by using the apparatus 200 for setting printing options. Printing options providing the user-input function may be set by using the apparatus 200 for setting printing options in an environment providing a GUI by using a LINUX-based OS.

In operation 1220, the user executes an application program, opens a document to be printed, and sets printing options other than the printing options providing the user-input function. By a driver module of the image forming apparatus 120 selected by the user, printing options supported by the corresponding image forming apparatus 120 are displayed on a user interface screen of the application program.

In operation 1230, the user requests to print the document by pressing a print button. In response to the request, a driver module of the corresponding image forming apparatus 120 is invoked.

In operation 1240, the driver module invoked in operation 1230 generates print data of the document to which printing options set by the application program are added. In other words, the print data generated in operation 1240 is print data without setting of printing options providing the user-input function.

In operation 1250, the driver module adds a command file generated by the apparatus 200 for setting printing options to the print data generated in operation 1240. Here, the task for adding the command file to the print data may be performed by the driver module of the image forming apparatus 120 or the apparatus 200 for setting printing options.

In operation 1260, the driver module transmits the print data to which the command file is added to the image forming apparatus 120 via the communication interface unit 240.

Here, the apparatus 200 may transmit the print data to which the command file is added to the image forming apparatus 120.

Even in an environment providing a GUI by using a LINUX-based OS, printing options providing the user-input function may be set by using the apparatus 200 for setting printing options. Therefore, various functions provided by the image forming apparatus 120 may be fully utilized, and user convenience may be improved.

What is claimed is:

1. A method of setting printing options at a host apparatus using a LINUX-based operation system (OS), the method comprising:

displaying at the host apparatus at least one printing option providing text input for a user from among printing options provided by an image forming apparatus connected to the host apparatus;

receiving setting information regarding printing options selected by a user from among the at least one printing option as text input displayed at the host apparatus; and storing the setting information with the corresponding printing options.

2. The method of claim 1, wherein the at least one printing option providing text input for a user comprises a printing option for authenticating a user of the image forming apparatus, and setting information regarding the printing option for authenticating a user of the image forming apparatus comprises a user ID and a password.

3. The method of claim 1, further comprising generating a command file according to the stored setting information.

4. The method of claim 3, further comprising, when print data is generated in response to a request of a user, adding the command file to the print data.

5. The method of claim 4, further comprising, when the setting information is stored, setting a flag value indicating that at least one printing option providing text input for a user is set.

6. The method of claim 5, wherein the adding the command file to the print data comprises:

determining whether the at least one printing option providing text input for a user is set based on the flag value; and if the at least one printing option providing text input for a user is set, adding the command file to the print data.

7. The method of claim 6, further comprising, when the command file is added to the print data, resetting the flag value.

8. The method of claim 1, wherein the displaying at least one printing option comprises:

displaying at least one printing option providing text input for a user with reference to a script file in which printing options of the image forming apparatus are defined.

9. The method of claim 1, wherein the storing the setting information input comprises:

storing the setting information in a database in XML format.

10. The method of claim 1, wherein the LINUX-based OS provides a graphic user interface (GUI) by using GNU network object environment (GNOME) or K desktop environment (KDE).

11. The method of claim 2, wherein the command file is defined by using a printer description language (PDL).

12. A non-transitory computer-readable recording medium having recorded thereon a computer program for implementing the method of claim 1.

13. An apparatus for setting printing options using a LINUX-based operation system (OS), the apparatus comprising:
- a user interface unit for receiving setting information regarding at least one printing option and displaying text input for a user at the apparatus from among printing options provided by an image forming apparatus connected to the apparatus as text input from a user;
- a memory for storing the setting information with the corresponding printing options; and
- a processor for generating a command file for setting printing options according to the stored setting information.

14. The apparatus of claim 13, wherein the at least one printing option providing text input for a user comprises a printing option for authenticating a user of the image forming apparatus, and
- setting information regarding the printing option for authenticating a user of the image forming apparatus comprises a user ID and a password.

15. The apparatus of claim 13, wherein, when print data is generated in response to a request of a user, the processor adds the command file to the print data.

16. The apparatus of claim 13, wherein, when the setting information is stored, the processor sets a flag value indicating that at least one printing option providing text input for a user is set.

17. The apparatus of claim 16, wherein the processor determines whether the at least one printing option providing text input for a user is set based on the flag value,
- if the at least one printing option providing text input for a user is set, the processor adds the command file to the print data, and
- when the command file is added to the print data, the processor resets the flag value.

18. The apparatus of claim 13, wherein the user interface unit displays at least one printing option providing text input for a user with reference to a script file in which printing options of the image forming apparatus are defined.

19. The apparatus of claim 13, wherein the LINUX-based OS provides a graphic user interface (GUI) by using GNU network object environment (GNOME) or K desktop environment (KDE).

20. An image forming system comprising:
- a host apparatus using a LINUX-based operation system (OS) which is connectable to a image forming apparatus for displaying a printing option for authenticating a user, receiving a user ID and a password with respect to the displayed printing option as text input, storing received user authentication information in a memory, setting the printing option for authenticating a user by generating a command file according to the stored user authentication information, and outputting print data including the command file; and
- an image forming apparatus for receiving the print data from the host apparatus, authenticating a user based on the command file, and performing a printing task.

* * * * *